O. E. MICHAUD.
ROLLER BEARING.
APPLICATION FILED MAR. 5, 1919.

1,363,340. Patented Dec. 28, 1920.

Inventor:
Ormisse E. Michaud,
by Carrett Carrett
his Attys

UNITED STATES PATENT OFFICE.

ONESIME E. MICHAUD, OF ST. LOUIS, MISSOURI.

ROLLER-BEARING.

1,363,340.  Specification of Letters Patent.  Patented Dec. 28, 1920.

Application filed March 5, 1919. Serial No. 280,703.

*To all whom it may concern:*

Be it known that I, ONESIME E. MICHAUD, a citizen of the United States, and a resident of the city of St. Louis and State of Missouri, have invented a new and useful Improvement in Roller-Bearings, of which the following is a specification.

This invention relates to antifriction bearings of the type wherein cylindrical or conical rollers having necks of reduced diameter between their ends are spaced around an inner bearing member in a circular series and retained thereon. The invention relates principally to a cage for retaining and spacing the rollers in parallel alinement on the inner bearing member independently of the outer bearing ring.

One of the principal objects of the present invention is to produce a roller cage or retainer of simple construction which can be cheaply manufactured from a single piece of sheet metal. Another object is to produce a spacing and retaining cage for roller bearings which will permit of removal and replacement of some of the rollers in the cage without disturbing the others. Another object is to facilitate the assembling of the parts.

The invention consists principally in a retaining member which is preferably made from a single piece of sheet metal and comprises an annular body portion having a plurality of spaced tongues projecting from one side thereof and disposed between the rollers of the bearing, the free end of said tongues being bent radially inward to hold the parts of the bearing in position and being capable of being sprung outwardly at their free ends to permit assembling of the bearing.

The invention further consists in the arrangements and combinations of parts hereinafter more fully described and claimed.

In the accompanying drawings, wherein like symbols refer to like parts wherever they occur, Figure 1 is an end view of the assembled bearing showing a retaining member embodying my invention applied thereto, the retaining member being shown partly in cross-section;

Figure 1:
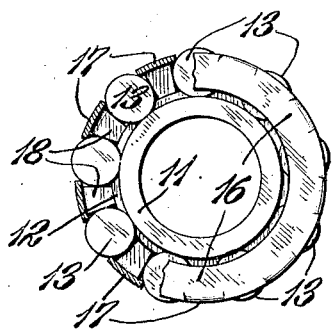
Figure 2:
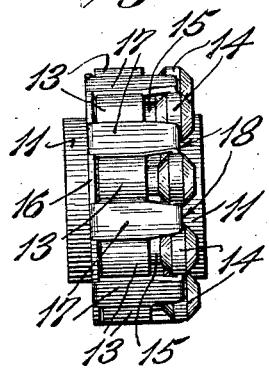
Fig. 2 is a side elevation of the bearing.
Figure 3:
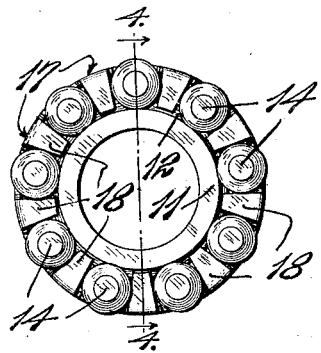
Fig. 3 is an end view of the bearing opposite to the end shown in Fig. 1.
Figure 4:
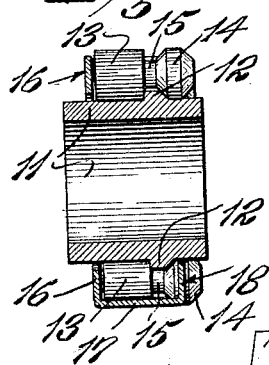
Fig. 4 is a diametrical section of the bearing on the line 4—4 in Fig. 3.

As shown in the accompanying drawing, the inner bearing ring 11 of the roller bearing has a circumferential or annular rib 12, one edge of which is beveled. Each of the bearing rollers comprises a cylindrical main body portion 13 which is grooved circumferentially near one end forming a cylindrical head 14 connected by a neck 15. The inner circumferential edge of the head portion 14 of the rollers coöperate with the adjacent beveled edge of the annular rib 12 of the inner bearing ring 11, and the outer circumferential edge of the head portion 14 of the rollers is also beveled to coöperate with a beveled flange of an outer bearing ring (not shown).

The retaining member or roller cage (see Figs. 5 and 6) comprises an annular body portion 16 having a series of equally spaced tongues or fingers 17, which project outwardly from the peripheral edge of the annular body portion 16 at one side thereof. These tongues 17 extend parallel with the axis of the bearing and fit between adjacent rollers, thus forming spacing members for holding the bearing rollers in spaced alinement on the inner bearing ring. The outer free ends of the tongues 17 of the retaining members are tapered and extend inwardly, as at 18, in a radial direction between the head portion 15 of the bearing roller to within a short distance of the inner bearing ring 11. The inwardly extending portions 18 of the spacing tongues 17 are located outside of the beveled rib of the inner bearing ring and thus prevent the retaining member or roller cage from slipping endwise off the inner bearing ring. The tongues 17 of the retaining member are located outside of the pitch circle or line of the centers of the rollers, and the spaces between the tongues are of less width than the diameter of the rollers, whereby outward displacement of the rollers with respect to the retaining members is prevented. Endwise movement of the rollers is prevented by the annular body portion or disk 16 at one end of the retaining member and by the circumferential flange or annular rib 12 of the inner bearing ring 11 at the opposite end.

Figure 7:
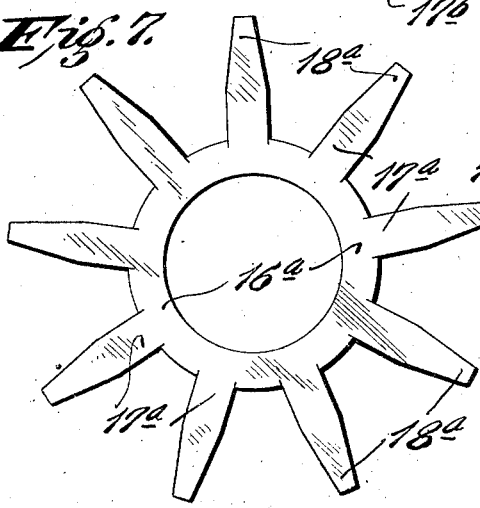
Fig. 7 is a view of the blank from which the retaining member is made.

The retaining member or roller cage is preferably made from a single piece of sheet metal from which the blank shown in Fig. 7 is stamped. The body portion of this blank comprises an annular disk $16^a$ which corresponds to the annular flange or ring 16 of the completed retaining member. Projecting outwardly in a radial direction from the outer circumference of the annular disk are equally spaced fingers or tongues $17^a$ which correspond to the tongues 17 of the finished retaining member. The free end portion of the fingers of the blank taper in width toward their free ends and their end portions $18^a$ correspond to the inwardly extending portion 18 of the tongues 17 of the retaining member. The fingers $17^a$ of the blank are bent at right angles to the plane of the annular disk on the same side thereof forming the tongues 17 of the retaining members and the tips $18^a$ of the fingers $17^a$ are thence bent back toward the center of the annular disk in the plane of the same forming the inwardly extending portions 18 of the finished retaining members.

Figure 8:
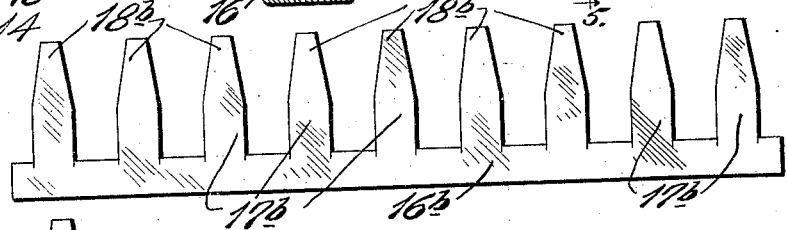
Fig. 8 is a view of a modified form of blank.

Another form of blank from which the retaining member may be formed is shown in Fig. 8. This blank comprises a strip $16^b$ which corresponds to the annular flange 16 of the finished retaining member. Projecting from one side of the strip $16^b$ of the blank are equally spaced fingers $17^b$. These fingers which correspond to the tongues 17 of the finished retaining member have their free ends tapered and their end portions $18^a$ correspond to the inwardly projecting portions 18 at the free ends of the tongues 17 of the finished cage. The retaining member is formed from the blank by bending the tongues at right angles to the plane of the strip $16^b$ and then rolling the strip into the form of an annular disk and welding the meeting ends. The tips $18^b$ of the fingers $17^b$ are bent inwardly in the plane of the annular disk, thus forming the finished retaining member.

Figure 5:
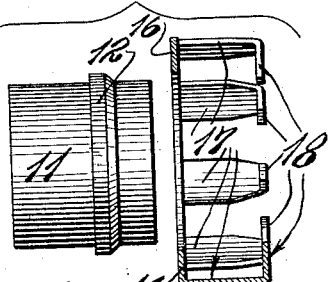
Fig. 5 is a view showing the retaining member in position to be slipped over the inner bearing ring, the inner bearing ring being shown in side elevation and the retaining member being shown in section on the lines 5—5 in Fig. 6.
Figure 6:
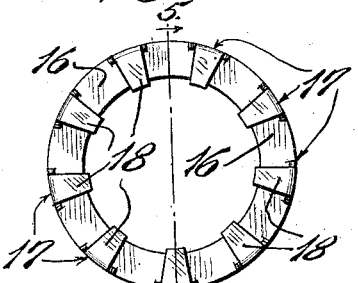
Fig. 6 is an end view of the retaining member showing the inwardly bent free ends of the tongues.
Figure 9:
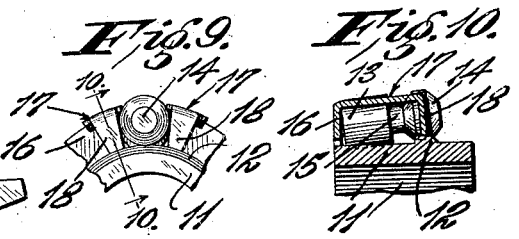
Fig. 9 is a fragmentary end view of the inner bearing ring and retaining member, showing a roller in position to be removed.
Figure 10:
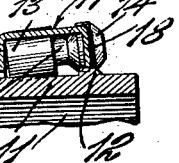
Fig. 10 is a cross-section on the line 10—10 in Fig. 9.

In assembling the parts of the bearing, the inner bearing ring and the retaining member are placed end to end in the position shown in Fig. 5 and the retaining member slipped over the inner bearing ring, the opening in the annular body portion 16 of the retaining member being of sufficient size to permit the retaining member to clear the beveled rib 12 of the inner bearing ring. These members may then be grasped between the thumb and forefinger of each hand (or otherwise suitably held) and the inner bearing ring forced in a direction toward the inwardly extending portions 18 at the free end of the tongues 17 of the retaining member. This action causes the inwardly projecting portion 18 of the free ends of the tongues 17 on each side of the space in which the roller is to be inserted to ride up on the beveled face of the rib 12 of the inner bearing ring 11, (see Figs. 9 and 10) and thus permits the roller to be inserted endwise between the adjacent tongues. This bending of the tongues 17 outwardly permits the rollers to clear the beveled rib 12 of the inner bearing ring. After the roller has been inserted between the adjacent tongues, the pressure on the inner bearing ring is relieved and the inwardly extending free end of the tongues is permitted to ride down the beveled rib 12 of the inner bearing ring and thus lock the roller firmly in position.

In the event that it is desired to remove an individual roller that has become damaged, the roller can be removed and another inserted by the process hereinbefore described without disturbing the other rollers.

The foregoing arrangement is considered only as an example and as being the one most generally adapted to the type of bearing shown, but the invention is not limited thereto, as the device is also applicable for use with bearings having tapered rollers.

What I claim is:

1. A retaining member for roller bearings comprising an annular body portion having a plurality of spaced tongues projecting from one side thereof, the spaces therebetween being of less width than the diameter of a roller, the free ends of said tongues being bent inwardly toward the axis of the bearing, the spaces between said inwardly bent free ends being of greater width than the diameter of a roller.

2. A retaining member for roller bearings comprising an annular body portion having a plurality of spaced circumferentially arranged tongues projecting from one side thereof, the spaces between said tongues being narrower than a roller, the free end portions of said tongues tapering in width and being bent inwardly toward the axis of the bearing, whereby the spaces therebetween are of greater width than the diameter of a roller.

3. A retaining member for roller bearings comprising an annular body portion, said body portion having spaced tongues at its outer edge, adapted to receive rollers in the spaces therebetween, said tongues extending from one side of said body portion substantially parallel with the axis thereof and being of less width than the diameter of a roller, said tongues tapering in width toward their free ends and having their free ends bent inwardly toward said axis whereby the spaces between the inwardly bent free ends of said tongues are of greater width than the rollers, thereby permitting the same to be passed endwise therebetween.

4. A retaining member for a roller bearing consisting of an annular disk having circumferentially disposed tongues projecting from one side thereof substantially parallel with the axis of said retaining member and adapted to receive the rollers in the spaces therebetween, the spaces between said tongues being of less width than the diameter of the rollers to prevent outward displacement of the same, the free ends of said tongues being bent radially inward and being of less width than the body portion of said tongues whereby the spaces therebetween are greater than the diameter of the rollers, said tongues being capable of being sprung outwardly at their free ends to permit assembling of the bearing.

5. In a roller bearing, the combination of an inner bearing member having an annular rib, bearing rollers coöperating with said bearing member, and a retaining member comprising an annular body portion having a plurality of spaced tongues projecting from one side thereof, said tongues being arranged between said bearing rollers and having their free ends bent inwardly to overlap said rib.

6. In a roller bearing, the combination of an inner bearing member having an annular rib, bearing rollers coöperating with said bearing member and grooved to straddle said rib, and a retaining member comprising an annular body portion having a plurality of spaced tongues projecting from one side thereof, said tongues being arranged between said bearing rollers and having their free ends bent inwardly to overlap said rib.

7. In a roller bearing, the combination with an inner bearing ring having an exterior annular rib, grooved bearing rollers straddling said rib and coöperating with the exterior surface of said bearing ring, and a retaining member comprising an annular disk located at one end of said bearing rollers and having spaced tongues projecting from one side thereof, said tongues being arranged between the rollers and being bent inwardly at their free ends beyond said rib.

8. In a roller bearing, the combination with an inner bearing ring having an exterior circumferential rib, one edge of which is beveled, grooved bearing rollers straddling said circumferential rib and coöperating with the exterior surface of said bearing ring, and a retaining member comprising an annular disk located at one end of said bearing rollers and having a plurality of equally spaced tongues projecting from one side thereof, said tongues being arranged between the rollers and extending radially inward at their free ends beyond the beveled circumferential rib of said inner bearing member.

9. In a roller bearing, the combination with an inner bearing ring having an exterior circumferential rib one side of which is beveled, bearing rollers coöperating with the exterior surface of said bearing ring opposite from the circumferential rib thereon, and a retaining member comprising a circular body portion positioned at the ends of said bearing rollers having tongues projecting from one side thereof, and said tongues being located farther from the axis of the bearing than the centers of said rollers and extending respectively into the spaces between said rollers, and said tongues having their free ends bent radially inward beyond the beveled side of the circumferential rib of said inner bearing ring to within a short distance of the exterior surface thereof.

10. In a roller bearing, the combination with an inner bearing ring having an annular rib thereon, one side of which is beveled, grooved bearing rollers coöperating with the exterior surface of said bearing ring with their grooved portions straddling said rib, and a retaining member comprising a circular body portion arranged at one end of said rollers and having equally spaced circumferentially arranged tongues at its outer periphery, said tongues projecting laterally from one side of said body portion, said tongues being disposed between the rollers and extending beyond said rib, said tongues tapering in width toward their free ends and being bent radially inward to overlap the beveled circumferential rib of said inner bearing ring.

11. The process of making roller bearings which consists in forming a retaining member comprising an annular disk having circumferentially arranged spaced tongues projecting laterally from one side thereof and whose ends are bent radially inward at their free ends, positioning a ribbed inner bearing ring with its rib opposite the inwardly extending ends of said retaining member, then forcing said rib against the inwardly extending free ends of said tongues whereby the tongues will be deflected outwardly and permit passage of the bearing roller, and then returning said tongues to their normal position.

Signed at St. Louis, Missouri, this 1st day of March, 1919.

ONESIME E. MICHAUD.